United States Patent [19]

Coe et al.

[11] Patent Number: 4,538,025
[45] Date of Patent: Aug. 27, 1985

[54] ANCHORING APPARATUS FOR A CAPACITOR

[75] Inventors: Jerry R. Coe; Godfrey R. Pearce; Francis R. See, all of Glasgow, Ky.

[73] Assignee: Emhart Industries, Inc., Indianapolis, Ind.

[21] Appl. No.: 570,883

[22] Filed: Jan. 16, 1984

[51] Int. Cl.³ .............................................. H01G 9/06
[52] U.S. Cl. ................................ 174/52 S; 174/15 R; 174/48; 174/52 PE; 361/272; 361/433
[58] Field of Search ..................... 29/570, 577 R, 588; 174/52 S, 52 PE, 15 R, 48; 361/272, 433, 327, 282, 283; 206/139; 220/206, 208, 209

[56] References Cited

U.S. PATENT DOCUMENTS 3,697,824 10/1972 Greskamp ........................... 361/433
3,986,083 10/1976 Carino ............................. 174/52 S X
4,323,724  4/1982 Shine ..................................... 174/48
4,342,070  7/1982 Evans ................................... 361/433
4,494,174  1/1985 Schroeder .......................... 361/433

Primary Examiner—A. T. Grimley
Assistant Examiner—Terry Flower
Attorney, Agent, or Firm—Robert F. Meyer

[57] ABSTRACT

An electrical device has an electrical component, a housing having an open end for receiving the electrical component, a closure member for sealing the open end of the housing, the housing including an inner wall and a shoulder on the inner wall providing a seat for the closure member, and a retainer for retaining the closure member in sealing engagement with the seat. The retainer includes a plurality of radially outwardly extending ears for gripping the inner wall of the housing. A plurality of radially inwardly projecting lugs are provided on the inner wall and each lug has an axially inwardly facing surface for engaging the ears to maintain the closure member in sealing engagement with the seat.

8 Claims, 3 Drawing Figures

ANCHORING APPARATUS FOR A CAPACITOR

The present invention relates to electrical devices of the type which include a housing having an open end for receiving an electrical component and a rigid member for sealing the open end to encapsulate the electrical component within the housing. More particularly, the present invention relates to means for anchoring the rigid sealing member in the open end of the housing to sealingly enclose the electrical component within the housing.

Many electrical devices include an electrical component enclosed within a housing. An A-C electrolytic capacitor is an example of such a component. Conventional dry-type electrolytic capacitors are formed by winding two sheets of metallic foil into a cylindrical shape. The foil sheets are separated by a suitable insulative material impregnated with an electrolyte. The foil and insulative materials cooperate to form the capacitor body or cartridge.

Conventional electrolytic capacitors are assembled by placing the capacitor cartridge within a suitable housing and attaching a sealing member to the housing to cover the open end of the housing and enclose the cartridge therein. To maintain the functionality of the capacitor, the sealing member must be hermetically sealed to the housing to prevent leakage of electrolyte from the cartridge to the environment. The gas pressure within the hermetically sealed housing frequently increases due to temperature rises that occur during operation of the conventional capacitor.

Electrolytic capacitors will fail when the expansion of gases within the closed volume of the housing causes the sealing member to move away from the cartridge and thereby break the hermetic seal between the sealing member and the housing. Typically, the rigid sealing member is secured to the housing by crimping the uppermost portion of a metallic housing to provide an annular flange for engaging an annular channel in the rigid sealing member as shown in U.S. Pat. No. 4,342,070. It is desirable to provide an improved means of securing sealing members to capacitor housings that is adaptable for use in molded plastic capacitor housings to prevent breakage of the hermetic seal and leakage of electrolyte from the captured capacitor body.

According to the present invention, an electrical device of the type including a housing having an open end for receiving an electrical component comprises a closure member adapted to block the open end of the housing to contain the electrical component therein. In an embodiment of the present invention, the electrical component is the capacitor body for an A-C electrolytic capacitor. The housing desirably includes shoulder means for supporting the closure member within the housing and a substantially cylindrical inner wall. The device further comprises means for gripping the inner wall of the housing to retain the closure member in position against the shoulder means to form a hermetic seal therebetween. Additionally, the device comprises means for anchoring the gripping means in a position within the housing to maintain the hermetic seal between the closure member and the housing in response to forces exerted by pressure increases due to the expansion of gases within the constant volume of the housing.

The shoulder means desirably includes a substantially flat annular ledge normal to the inner wall of the housing to present an upwardly-facing surface for supporting the closure member. The anchoring means can include a plurality of uniformly spaced-apart lugs on the inner wall of the housing which project radially inwardly therefrom into the cavity of the housing. Each lug preferably includes a substantially flat, axially inwardly-facing surface for engaging the gripping means.

The gripping means includes a ring member having a peripheral edge and a plurality of circumferentially spaced ears depending and projecting radially outwardly therefrom. When the electrical device is assembled, the ring member is positioned so that at least one of the ears engages the axially inwardly-facing surface of each lug to retain closure member between the ring member and the annular ledge to maintain the hermetic seal therebetween.

One feature of the present invention is the snap-in assembly of the ring member in a position within the housing. An advantage of the snap-in assembly feature is that it facilitates the location and assembly of the ring member against the closure member. The closure member is forced against the annular ledge and is prevented from moving in an axially outward direction to break the hermetic seal which serves to contain the liquid electrolyte within the sealed housing.

Another feature of the present invention is the substantially uniform spacing between the lugs. Molded cylindrical phenolic housings are seldom characterized by perfectly round cross-sectional dimensions. This "out-of-roundness" frequently causes one side of the closure member to catch or drag against the inner wall of the housing while the opposite side is slightly raised. The result is that one peripheral portion of closure member of a conventional electrical device fails to seat properly. An advantage is that the lugs of the present invention help to center the closure member as it is inserted into the housing causing the closure member to seat properly against the annular ledge. Thus, the lugs help to provide a better seal to contain the electrolyte.

Yet another feature of the present invention is that the lugs project radially inwardly from the inner wall of the housing to provide a series of annular spaces between adjacent lugs. An advantage is that these spaces act to vent air from the axially lower portion of the housing to the environment as the closure member is inserted. It is easier to effect a hermetic seal due to the provision of this means for allowing air to escape.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
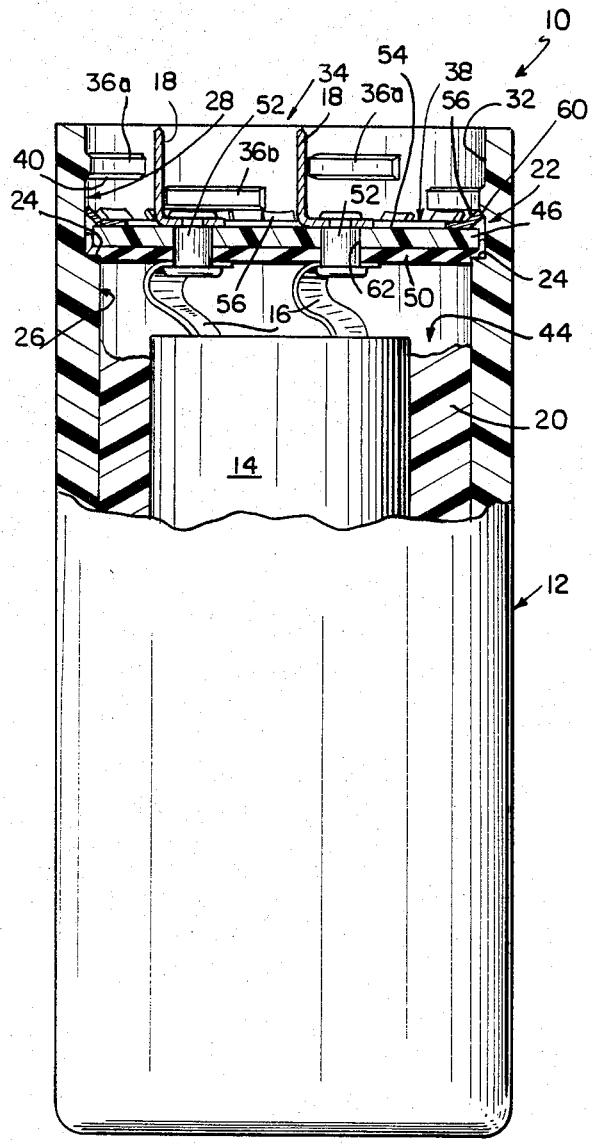
FIG. 1 is a side elevational view, partially broken away, of an embodiment of the present invention showing a capacitor body enclosed within a housing and a closure member pressed into sealing engagement with the shoulder of the housing by a snap-locked gripping ring.

As can be seen from FIG. 1, the electrical capacitor 10 of the present invention comprises a cylindrical container or can 12 made of a thermoplastic material such as a phenolic resin. Placed within the container 12 is a conventional capacitor body 14. The capacitor body 14 preferably comprises a plurality of sheets of metal electrodes (not shown) having insulative spacer sheets (not shown) placed therebetween. These insulative sheets are preferably impregnated with a liquid electrolyte of known composition to provide the capacitor dielectric. A pair of electrically conductive tabs 16 are coupled to the capacitor body 14 in the conventional manner to provide coupling leads from the metallic electrode sheets to a pair of terminal lugs 18. The terminal lugs 18 are mounted in a closure member 22 in a conventional manner. A typical electrolytic capacitor of type shown in the figures is a two-terminal capacitor designed for use with alternating current to start fractional horsepower electric motors.

At the bottom portion of the container 12 there preferably is provided an anti-vibratory material or medium 20 to reduce or avoid vibration of capacitor body 14 with respect to container 12. Heat developed in the capacitor body may be transmitted through this material 20 and through container 12 to the atmosphere. Examples of suitable thermally conductive materials include conventional "potting" compositions such as tar and asphalt. Thermally conductive polymeric materials may also be utilized to the extent that they are economically feasible.

Figure 2:
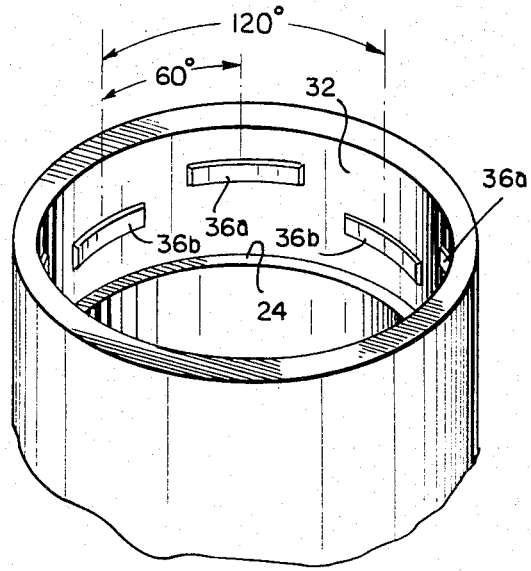
FIG. 2 is an isometric view of the electrical device shown in FIG. 1 showing the annular ledge for supporting the closure member and two sets of spaced lugs.

At the upper portion of the container 12 shoulder means are provided for seating the closure member 22 thereon. The shoulder means may include a narrow annular ledge 24 as best illustrated in FIG. 2. The annular ledge 24 is a molded feature of the phenolic container 12.

The substantially flat ledge 24 lies in a plane that divides the interior of container 12 into an axially lower cylindrical chamber 26 and an axially upper cylindrical chamber 28 as shown in FIGS. 1 and 2. The chambers 26 and 28, as well as the annular ledge 24, are formed when the container is molded. The diameter of the axially upper chamber 28 is slightly greater than the diameter of the axially lower chamber 26. The width of the annular ledge 24 is substantially equivalent to the difference in dimension of the two above-described chamber diameters.

The upper chamber 28 includes an inner wall 32 and provides an opening 34 in the container 12 for receiving elements of the electrical component such as the capacitor body 14 and the closure member 22. A plurality of uniformly spaced lugs 36 are formed along the inner wall 32 of the upper chamber 28. In the illustrative embodiment, each lug 36 has a length of approximately 0.500 inch. The lugs 36 cooperate to provide means for snapping a gripping means or retaining ring 38 in place to anchor the closure member 22 against the annular ledge 24 in a manner which will be explained below. Each lug 36 projects radially inwardly into the interior of the upper chamber 28 and includes a substantially flat, axially inwardly-facing surface 40 as shown in FIG. 1. The width of the lug surface 40 is less than the width of the annular ledge 24 to permit the closure member 22 to pass freely through the upper chamber 28 in an axial direction to seat on the annular ledge 24. The lugs 36 are formed in the mold by adapting the core pin to include circumferentially spaced cuts of the proper shape and size. In this manner, it will be apparent to a skilled moldmaker that as the phenolic container 12 is stripped off the lug-forming core pin (not shown) the container 12 will include a plurality of lugs 36 in addition to the annular ledge 24.

The container 12 is molded to include two sets or levels of lugs 36a and 36b so that one container 12 may be used with different capacitor bodies 14. The second set of lugs 36b is formed on the inner wall 32 to lie axially between the annular ledge 24 and the first set of lugs 36a. This feature enables an assembly-line technician to adapt one container 12 to accommodate two styles of capacitor bodies 14. The container 12 is adapted merely by selecting a different chamber-forming core pin during the molding process to vary the axial position of ledge 24. Each level 36a and 36b includes three lugs 36 uniformly spaced approximately 120° apart. The lugs 36a of one level are circumferentially staggered with respect to the lugs 36b of the other level. For example, the center of each lug 36b is situated along the cylindrical inner wall 32 at an angle of approximately 60° with respect to the center of the "adjacent" lugs 36a, as best illustrated in FIG. 2. Both levels of lugs 36a and 36b are formed in each container 12 for manufacturing purposes, although only one level of lugs 36 in the assembly of each capacitor is used.

The lower chamber 26 includes a smooth inner wall 42 and is sized to receive the capacitor body 14. The diameter of the lower chamber 26 is greater than the diameter of the capacitor body 14 to provide an annular space 44 between the capacitor body 14 and the inner wall 42 of the lower chamber 26 to receive the thermally conductive, anti-vibratory potting material 20.

The closure member 22 includes a relatively rigid upper member or disk 46 made for example of thermoplastic material such as a phenolic resin. If desired one or more vent holes 48 may be provided therein. The closure member 22 further includes a lower member 50 made of elastomeric material such as natural or synthetic rubber. If desired the lower member 50 may be pierced partially or all the way through in the vicinity of vent hole(s) 48. However, for many applications the member 50 need not be pierced and if sufficiently high pressures are reached in the device the pressures will pierce the elastomeric material, giving the desired venting to the atmosphere rather than an explosion. Terminal lugs 18 are fixed to the rigid disk member 46 by rivets 52. The distal ends of the two capacitor body tabs 16 are electrically connected to the terminal lugs 18 by the rivets 52.

Figure 3:
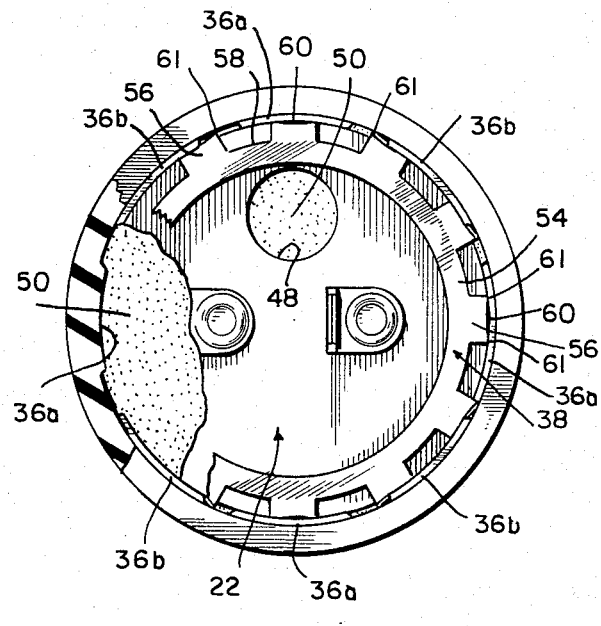
FIG. 3 is a top plan view, partially broken away, showing the snap-locked gripping ring and the circumferentially spaced ears.

The gripping means or retaining ring 38 includes a ring member 54. A plurality of ears 56 depend from the outermost circumferential edge 58 of the ring member 54. Ring member 54 with ears 56 extending radially outwardly has a diameter that is approximately 0.125 inch less than the outside diameter of the container 12. The ears 56 are uniformly spaced about the circumference of the ring member 54 and bent angularly upwardly therefrom during assembly of the capacitor 10, as shown in FIG. 1. The ring member 54 is made of a heat-treated spring steel. The distal ends 60 of the ears 56 cooperate to define a substantially circular perimeter having a diameter that is greater than the diameter of the upper chamber 28 before assembly. Thus, insertion of the retaining ring 38 into the upper chamber 28 for the purpose of pressing or forcing the closure member 22 against the annular ledge 24 causes the ring ears 56 to deform upon contact with the inner wall 32. The deformed ears 56 exert a radially outwardly directed force upon the inner wall 32 of the upper chamber 28 due to the resilient nature of the ring material. As best seen in FIGS. 1 and 3 the distal ends 60 of the ears 56 are slightly concave so as to provide sharp outer edges 61 to grip the innerwall 32 surface. Further, the ears 56 are sized to snap underneath the axially inwardly-facing surface 40 of the appropriate set of lugs 36a or 36b when the retaining ring 38 is positioned adjacent the seated closure member 22. The retaining ring 38 forces the closure member 22 against the annular ledge 24 to effect a hermetic seal therebetween as a result of the "gripping-action" of the ears 56 on the inner wall 32 and the "snap-action" of the ears 56 under the spaced lugs 36.

The electrolytic capacitor 10 is assembled by placing the tabs 16 of the capacitor body 14 over an anvil pin (not shown). A pair of terminal lugs 18 are positioned on a closure member 22 which is subsequently positioned on the tabs 16 so the tabs 16 and the terminals 18 are aligned with two rivet-accepting holes 62 provided in the closure member 22. This assembly is placed underneath a riveter (not shown) which fires a rivet 52 through each of the holes 62 and crimps or brads the rivets 52 over forming a seal through the holes. The electrically conductive rivets 52 tie the components together to provide an electrically conductive path from each terminal 18 to its respective electrode sheet in the windings of the capacitor body 14. This sub-assembly is placed into a container 12.

The assembly as described above is then transported to a machine that first drops a container 12 into a nest. The container 12 is indexed under a tarpot which pours tar 20 into the container 12 to anchor the capacitor body 14. The closure member 22 is positioned to engage the annular ledge 24.

Finally, the retainer ring 38 is pressed into the container 12 forcing the closure member onto the ledge 24 to effect a hermetic seal therebetween. As the retainer ring 38 is thrust downward the ears 56 of the ring 38 override and snap under one set of lugs 36 to anchor the retainer ring 38 and the closure member 22 in place. This novel snap feature prevents increased gas pressure within the enclosed lower chamber 26 from exerting a force to the underside of the closure member 22 which will be sufficient to break the hermetic seal. The angle and rigidity of the ears 56 and their relationship to the lugs 36 prohibit closure member 22 from moving axially outward. Thus, the integrity of the electrolytic capacitor is maintained since the liquid electrolyte is prevented from leaking from the capacitor body 14 into the environment.

Although the invention has been described in detail with reference to certain preferred embodiments and specific examples, variations and modifications exist within the scope and spirit of the invention as described and as defined in the following claims.

What is claimed is:

1. An electrical device comprising an electrical component, a housing having an open end for receiving the electrical component, a closure member for sealing the open end of the housing, the housing including an inner wall and a shoulder on the inner wall providing an axially outwardly facing seat for the closure member, retaining means for retaining the closure member in sealing engagement with the seat, the retaining means including a plurality of radially outwardly extending ears for gripping the inner wall of the housing, and a plurality of radially inwardly projecting lugs on the inner wall of the housing, each lug having an axially inwardly facing surface for engaging the ears to maintain the closure member in sealing engagement with the seat.

2. The electrical device of claim 1 wherein the retaining means includes a ring member having a peripheral edge, the plurality of ears depending from the peripheral edge of the ring member and projecting radially outwardly therefrom.

3. The electrical device of claim 2 wherein the housing is generally cylindrical and has an inside diameter and each of the ears has a distal end cooperating to define a generally circular shape for the retaining means, the circular retaining means has a diameter that is greater than the inside diameter of the cylindrical housing.

4. The electrical device of claim 3 wherein the retaining means is formed of a resilient heat-treated steel material to thereby enable the ears to deform in response to contact with cylindrical inner wall of the housing, and to snap underneath the lugs when the ring member is forced into the open end of the housing.

5. The electrical device of claim 4 wherein the distal end of each ear is concave so as to provide sharp outer edges for gripping the inner wall of the housing.

6. The electrical device of claim 5 wherein the lugs are circumferentially spaced apart an angle of about 120°.

7. The electrical device of claim 6 comprising a first set of three lugs and a second set of three lugs, the second set of lugs being axially positioned on the inner wall of the housing between the shoulder and the first set of lugs and circumferentially positioned an angle of 60° with respect to the lugs of the first set of lugs.

8. The electrical device of claim 1 wherein said electrical component is a capacitor.

* * * * *